US009739570B1

(12) United States Patent
Beard

(10) Patent No.: US 9,739,570 B1
(45) Date of Patent: Aug. 22, 2017

(54) GIMBAL-ASSISTED RADAR DETECTION SYSTEM FOR UNMANNED AIRCRAFT SYSTEM (UAS)

(71) Applicant: uAvionix Corporation, Omaha, NE (US)

(72) Inventor: Paul Beard, Bigfork, MT (US)

(73) Assignee: uAvionix Corporation, Palo Alto, CA (US)

( * ) Notice: Subject to any disclaimer, the term of this patent is extended or adjusted under 35 U.S.C. 154(b) by 0 days.

(21) Appl. No.: 15/585,998

(22) Filed: May 3, 2017

(51) Int. Cl.
*F41G 7/22* (2006.01)
*G01S 7/41* (2006.01)
*G01S 13/72* (2006.01)
*G01S 13/66* (2006.01)

(52) U.S. Cl.
CPC ......... *F41G 7/2246* (2013.01); *F41G 7/2286* (2013.01); *G01S 7/41* (2013.01); *G01S 13/66* (2013.01); *G01S 13/72* (2013.01)

(58) Field of Classification Search
CPC ........ F41G 7/22; F41G 7/2206; F41G 7/2213; F41G 7/2246; F41G 7/2286; F41G 7/20; G01C 21/00; G01S 13/66; G01S 13/60; G01S 13/605; G01S 7/4004; G01S 13/72; H01Q 3/02; H01Q 3/04; H01Q 3/08
See application file for complete search history.

(56) References Cited

U.S. PATENT DOCUMENTS

| | | | | |
|---|---|---|---|---|
| 4,136,343 A * | 1/1979 | Heffner | ................... | G01S 3/325 244/3.19 |
| 4,520,973 A * | 6/1985 | Clark | ................... | F41G 7/2213 244/3.16 |
| 5,052,637 A * | 10/1991 | Lipps | ................... | F41G 7/2213 244/3.15 |
| 5,173,703 A * | 12/1992 | Mangiapane | ........... | G01S 13/90 342/149 |
| 5,696,347 A * | 12/1997 | Sebeny, Jr. | ........... | F41G 7/2213 102/211 |
| 9,170,069 B1 * | 10/2015 | Smith | ..................... | G01S 7/495 |

(Continued)

FOREIGN PATENT DOCUMENTS

WO    WO 9301465 A1 *   1/1993   ........... F41G 7/2213

OTHER PUBLICATIONS

Ashok Gorwara et al., Doppler micro sense and avoid radar, Proc. SPIE vol. 9647, Unmanned/Unattended Sensors and Sensor Networks XI; and Advanced Free-Space Optical Communication Techniques and Application, 964708, Oct. 13, 2015, 12 pages.

*Primary Examiner* — John B Sotomayor
(74) *Attorney, Agent, or Firm* — Suiter Swantz pc llo

(57) ABSTRACT

A gimbal-assisted continuous-wave (CW) Doppler radar detection system mountable to an unmanned aircraft system may be rotated in three degrees of freedom relative to the UAS to provide targeted multidirectional obstacle detection by transmitting CW signals throughout a field of view and analyzing reflected signals from obstacles within the field of view. The radar assembly may be articulated to provide track-ahead detection in anticipation of a heading or altitude change of the UAS, to center on a detected obstacle in order to classify or identify it more clearly. The radar assembly may be rotated below the UAS and its field of view changed to increase breadth and accuracy at a shorter effective range, in order to determine real-time altitude or terrain data while the UAS executes a landing.

18 Claims, 7 Drawing Sheets

(56) References Cited

U.S. PATENT DOCUMENTS

| | | |
|---|---|---|
| 2014/0062755 A1 | 3/2014 | Kabrt et al. |
| 2014/0139366 A1 | 5/2014 | Moses et al. |
| 2016/0069994 A1 | 3/2016 | Allen et al. |
| 2016/0196750 A1 | 7/2016 | Collins |

* cited by examiner

GIMBAL-ASSISTED RADAR DETECTION SYSTEM FOR UNMANNED AIRCRAFT SYSTEM (UAS)

BACKGROUND

Compact airborne vehicles, such as unmanned aircraft systems (UAS), hobbycraft, and the like, may operate with full or partial autonomy (e.g., partially controlled by a remote operator) in approved airspaces. However, the airspaces and conditions under which semiautonomous and autonomous UAS may operate are inconsistent from locality to locality or from state to state. To ensure that a UAS may safely operate in, for example, populated areas or areas in which civil or commercial aircraft may be found, the UAS should be able to detect and avoid obstacles, during liftoff and landing as well as inflight. A compact UAS may not have the necessary size, processing power, or complexity for a computer vision based detect-and-avoid system or a phased array antenna-based system, nor may such systems be cost-effective for all UAS operations. Furthermore, it may be desirable for a detect-and-avoid system to "see" independently of the UAS flight plan, e.g., around, behind, or below an airborne position of the UAS. Current radar-based detection systems may be designed for omnidirectional object detection, but strictly in the horizontal plane. Such systems cannot be used, for example, to assist an autonomous landing from an unknown height onto potentially unfamiliar terrain.

SUMMARY

In one aspect, embodiments of the inventive concepts disclosed herein are directed to a gimbal-assisted radar detection system mountable to an unmanned aircraft system (UAS). The system may include a continuous-wave (e.g., Doppler) radar emitter and receiver, gimbal-mounted to the UAS airframe such that the emitter/receiver assembly may be rotated through yaw, pitch, and roll axes (e.g., to maintain a fixed location of the assembly through direction/orientation changes of the UAS proper). The emitter may transmit continuous-wave radar signals throughout a defined field of view, detecting potential obstacles within the field of view based on the signals reflected to the receivers. The radar emitter/receiver assembly may include processors for identifying detected obstacles by determining the size, shape, or distance of the obstacles.

In a further aspect, embodiments of the inventive concepts disclosed herein are directed to a UAS configured for radar-based obstacle detection. The UAS may include an airframe or fuselage within which the propulsion and control systems are at least partially enclosed, the propulsion system capable of maintaining the velocity, heading, or orientation of the UAS and the control system including processors for controlling the velocity, heading, or orientation (e.g., based on a predetermined flight plan or operator input). A continuous-wave radar assembly may be gimbal-mounted to the airframe; the radar assembly may be rotatable through roll, pitch, and yaw axes independent of the UAS orientation via the gimbals. The radar assembly may include emitters and receivers as well as control processors for maintaining or adjusting the orientation of the radar assembly. The emitters may transmit continuous-wave (CW) radar signals throughout a predetermined field of view and to a predetermined range set by the control processors. The radar assembly may detect one or more obstacles within the field of view and the effective range based on reflected CW radar signals bounced back to the receivers by the obstacles. The control processors may attempt to classify or identify the detected obstacles by determining their size, shape, or distance from the UAS.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
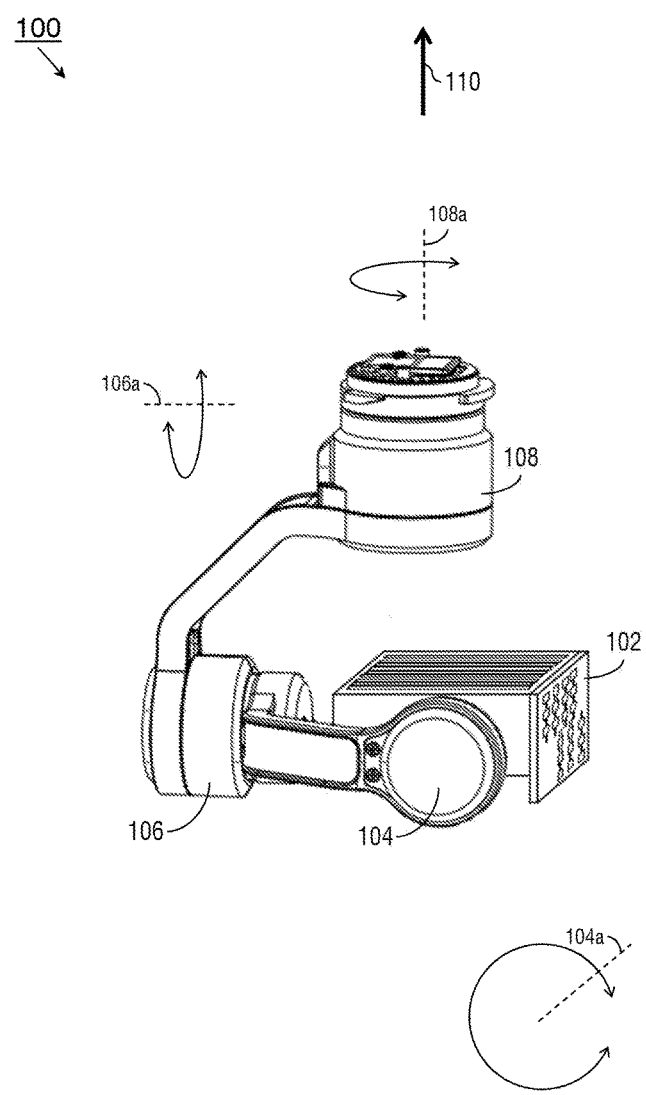
FIG. 1 illustrates an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for gimbal-assisted sense-and-avoid (SAA) radar detection aboard an unmanned aircraft system (UAS) or other like compact autonomous or semiautonomous vehicle. The system may "see" or detect aircraft, vehicles, or other proximate obstacles in variable directions, e.g., looking "ahead" based on the current heading or flight plan of the UAS or serving as a radar altimeter by scanning the ground below the UAS, e.g., in anticipation of a landing. The system may focus on and attempt to identify a detected obstacle, e.g., by correlation with known objects or position signals received aboard the UAS from proximate objects.

Referring to FIG. 1, an exemplary embodiment of a gimbal-assisted radar detection system 100 according to the inventive concepts disclosed herein may include a continuous-wave (CW) radar assembly 102 mountable to a UAS or like vehicle (not shown) by brushless gimbals 104, 106, 108. For example, the system 100 may be removably mounted (110) to the UAS airframe and may draw operating power from a power source on board the UAS, connecting the CW radar assembly 102 to control and peripheral systems of the UAS or providing for articulation of the CW radar assembly 102 (via the gimbals 104, 106, 108) by a remote operator of the UAS or autonomously by the UAS control system. Each of the gimbals 104, 106, 108 may be serially connected so as to allow the CW radar assembly 102 to rotate along three rotational axes (e.g., a "roll" axis 104a, "pitch" axis 106a, and "yaw" axis 108a by articulating one or more gimbals as needed, each rotational axis corresponding to a gimbal 104, 106, 108) independent of the roll, pitch, and yaw axes (or x-, y-, and z-axes) of the UAS proper.

Figure 2:
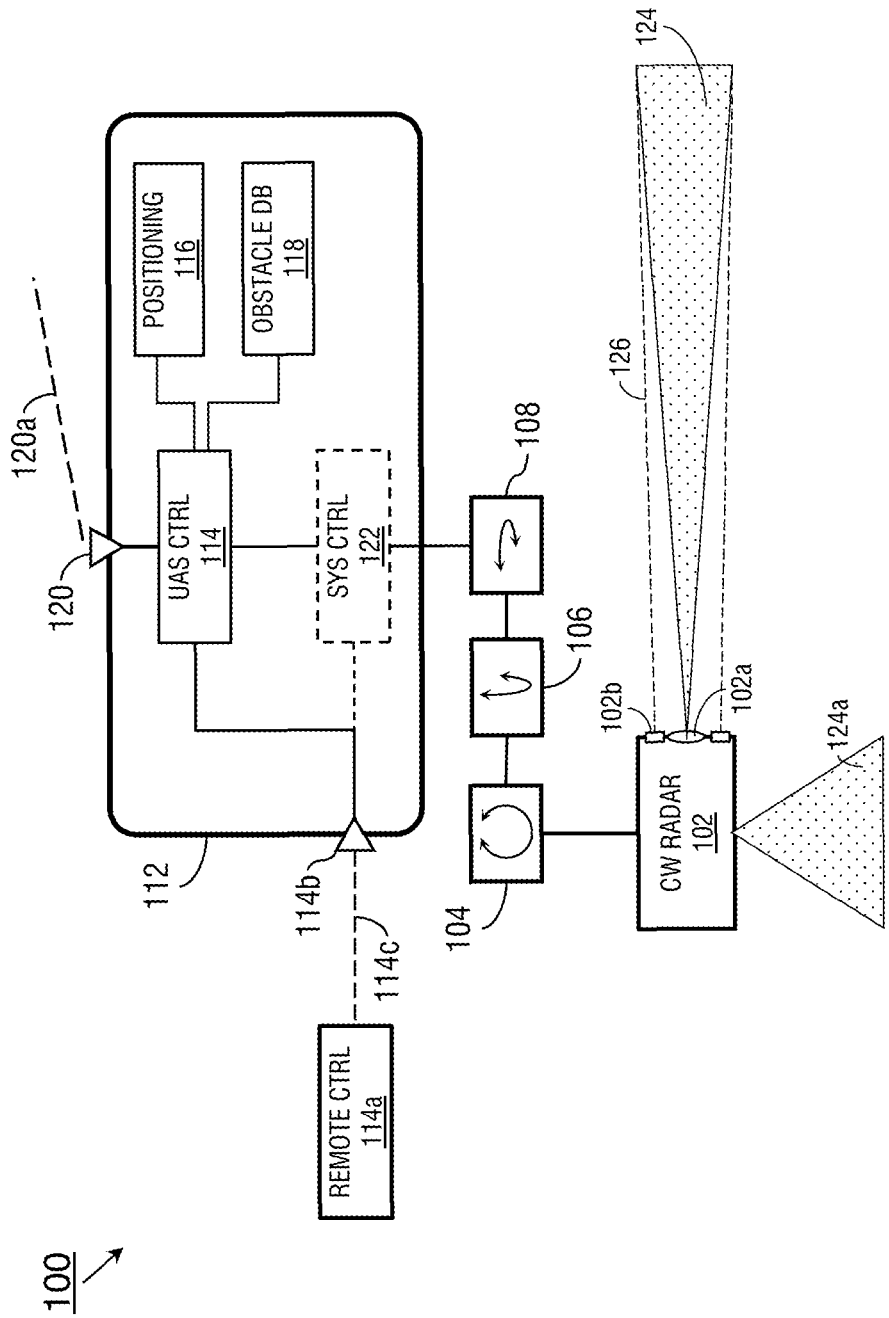
FIG. 2 is a diagrammatic illustration of components of the system of FIG. 1 and an unmanned aircraft system (UAS) to which it may be mounted according to the inventive concepts disclosed herein.

Referring now to FIG. 2, the system 100 may be removably mounted to the airframe of a UAS 112 and interface with one or more of the onboard systems or components of the UAS 112, e.g., the UAS control system 114, a positioning system 116, an obstacle database 118 stored to memory aboard the UAS, or a signal receiver 120 capable of receiving secondary surveillance radar (SSR) signals (120a) (e.g., ADS-B signals) from other aircraft, ground-based vehicles, or ground-based stations proximate to the UAS 112. The UAS control system 114 may maneuver the UAS 112 via any appropriate propulsion system, e.g., motor-driven rotors, adjusting the velocity, heading, or rotational orientation of the UAS (relative to the roll, pitch, and yaw axes of the UAS) based on obstacles detected or identified by the system 100. The system 100 may include its own onboard control processors (122) or be configured for control by the UAS control system 114. The UAS control system 114 may be fully incorporated onboard the UAS 112, e.g., for fully autonomous operations, or partially incorporated into a remote control unit (114a) via which a remote operator may issue command input (or receive sensor data) via a transceiver (114b) mounted to the airframe to which the remote control unit 114a may be wirelessly linked (114c).

The positioning system 116 may include a satellite-based navigational system (e.g., GPS, GLONASS, Compass, Galileo) capable of determining absolute positions of the UAS 112; however, embodiments of the UAS 112 may not be so equipped and may instead determine a current position of the UAS 112 relative to a fixed or georeferenced position (e.g., to a liftoff point marking the start of the UAS flight plan) or relative to neighboring objects or vehicles, based on position data collected from said objects or vehicles. For example, the positioning system 116 may correlate SSR signals received from other aircraft and determine, based on the transmission time of said SSR signals, approximate positions of the transmitting aircraft. Given enough received SSR signals, the positioning system 116 may correlate their various transmission times and distances to extrapolate a location of the UAS 112. Similarly, the signal receiver 120 may include processors for decoding ADS-B signals received from other aircraft (or from ground-based stations) to extract position data of the transmitting aircraft and stations; the signal receiver (120) or UAS control system 114 may thereby track the positions of known aircraft over time as the UAS 112 fulfills its flight path.

The CW radar assembly 102 may be capable of detecting obstacles by emitting (via emitters 102a) a continuous stable-frequency radar signal (124), a portion of which (126) may be reflected by proximate objects and received by receiver elements (102b) at the CW radar assembly. For example, the CW radar assembly 102 may be a millimeter-wave Doppler-based assembly insensitive to degraded visual environments (DVE), e.g., low-light conditions, dusty or hazy conditions, dazzling sunlight, or fog. The control processors 122 (or the UAS control system 114) may analyze the reflected energy to determine if obstacles are present and, if so, the approximate size, shape, or proximity of any detected obstacles. The CW radar assembly 102 may have a field of view 124 (FOV) and an effective range adjustable by the control processors 122 or UAS control system 114 depending on the desired mode of operation. For example, the CW radar assembly 102 may be positioned by the gimbals 104, 106, 108 so as to scan a FOV 124 substantially "ahead" or "forward" of the UAS 112, depending on its current heading or flight plan (as will be explained in greater detail below). The CW radar assembly 102 may scan the "forward" FOV 124 in sense-and-avoid (SAA) mode, in order to detect (and, if possible, classify or identify) potential obstacles in the flight path of the UAS 112 (e.g., at an effective range of up to 150 m). If an obstacle cannot be positively identified to a desired confidence level, the obstacle may be more broadly classified in order to minimize false detections or identifications. Should the UAS 112 execute landing operations, the CW radar assembly 102 may be reoriented via the gimbals 104, 106, 108 to scan a broader FOV (124a) at greater accuracy but over a shorter effective range (e.g., 10 m). For example, the UAS 112 may be directed to land from an unclear operating altitude (e.g., if the UAS 112 is not otherwise equipped with an onboard altimeter) to terrain of unclear composition (e.g., a rocky surface or combination of land and water). The CW radar assembly 102 may be rotated to point "down", e.g., toward the ground, so that the CW radar assembly 102 may serve as a radar altimeter, tracking the height of the UAS 112 above ground level and selecting an optimally level landing area.

The obstacle database 118 may be stored to an onboard memory of the UAS 112 and may include reference data of the relative sizes and shapes of common aircraft and obstacles likely to be encountered by the UAS 112 along a given flight path, as well as the sizes, shapes, and locations of natural or manmade features. The obstacle database 118 may be customized for a given flight plan or operating location and loaded to the UAS 112, or the obstacle database 118 may be a comprehensive database to which the control processors 122 or UAS control system 114 may add any detected obstacles not successfully cross-referenced with an object already in the database. For example, when the CW radar assembly 102 detects an obstacle within the FOV 124, the CW radar assembly 102 may be reoriented (via the gimbals 104, 106, 108) to center the FOV on, and identify if possible, the detected obstacle by correlating the size or shape of the obstacle to examples in the obstacle database 118.

Figure 3A:
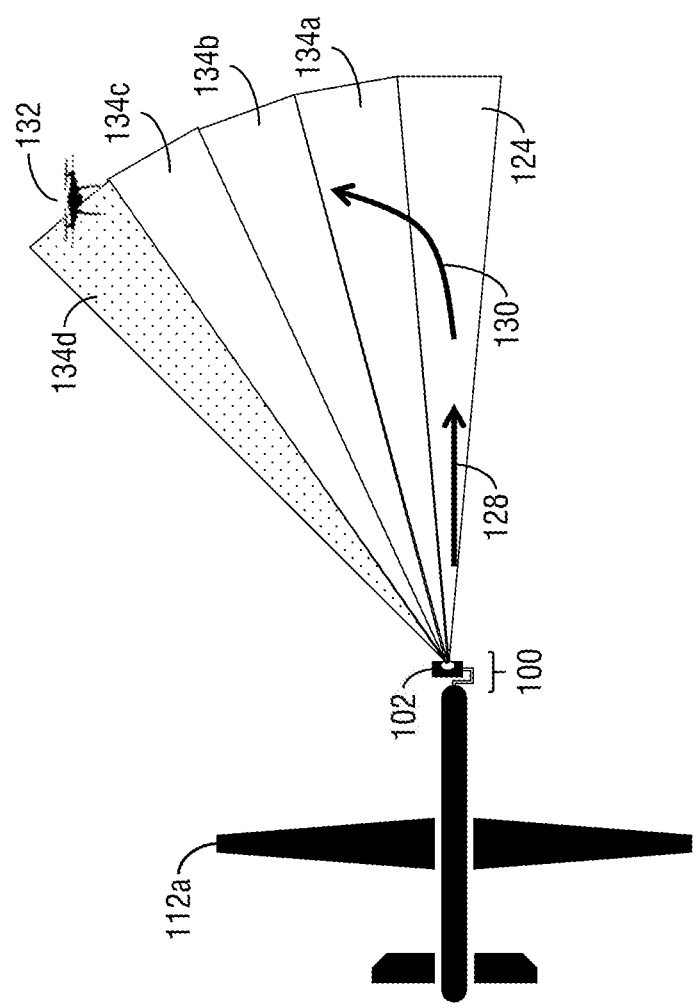
FIGS. 3A and 3B are diagrammatic illustrations of track-ahead and sense-and-avoid modes of the system and UAS of FIG. 2.

Referring to FIG. 3A, the UAS 112*a* may be implemented and may operate similarly to the UAS 112 of FIG. 2, except that the UAS 112*a* may use the system 100 to provide track-ahead detection in coordination with heading or altitude changes according to its flight plan. For example, the UAS 112*a* may operate autonomously according to a predetermined flight plan, and the system 100 may be forward-mounted to the underside of the airframe. The system 100 may scan a forward FOV (124) while the UAS 112*a* proceeds forward (128) according to its flight plan. In anticipation of an imminent or future change in heading (130), the system 100 may rotate the CW radar assembly (102, FIGS. 1/2) according to the change in heading to detect obstacles (e.g., an opposing UAS 132) in a FOV (134*a-d*) corresponding to the future path or heading (130) of the UAS 112*a*.

Figure 3B:
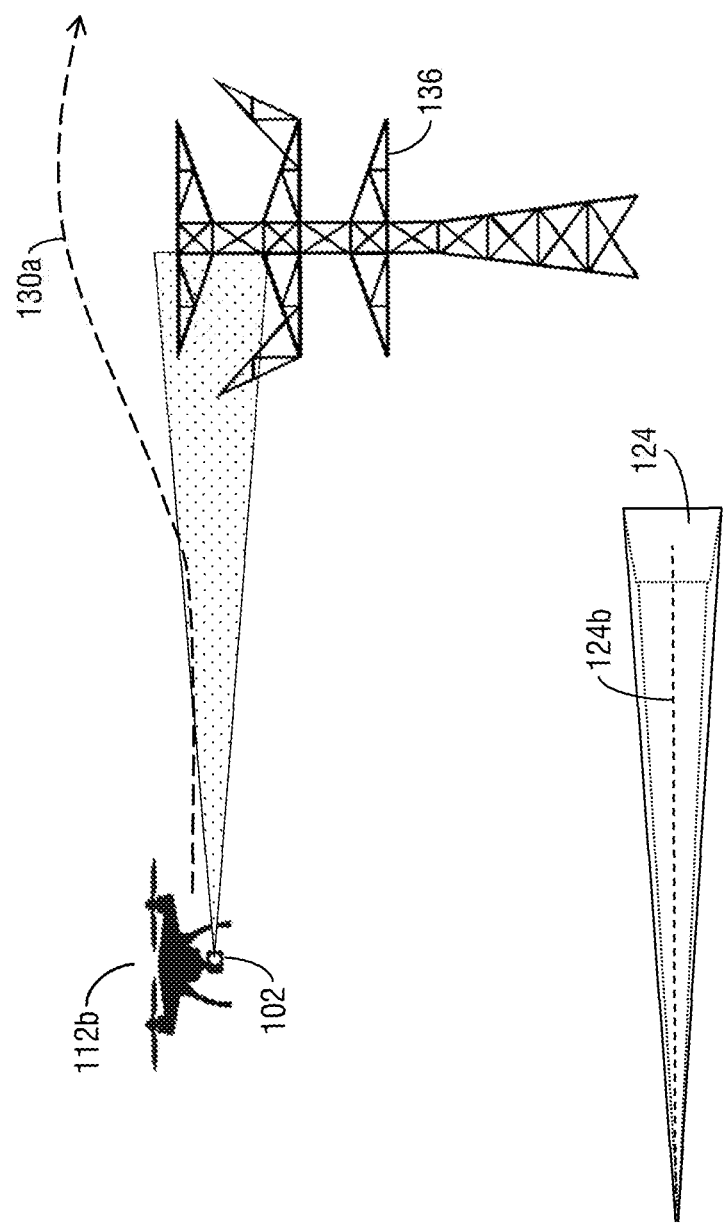

Referring to FIG. 3B, the UAS 112*b* may be implemented and may operate similarly to the UAS 112*a* of FIG. 3A, except that the UAS 112*b* may travel along a relatively straight course and scan a FOV 124 directly ahead (based on the current course or heading of the UAS) to detect and identify objects such as an electrical tower (136) in the path of the UAS 112*b*. The system 100 may attempt to determine the approximate size or shape of the object (or a portion of the object) based on, e.g., the current size of the FOV 124 and current effective range (124*b*). For example, in sense-and-avoid mode, an exemplary embodiment of the system 100 may be capable of range accuracy of 2 cm and range resolution of 17 cm, velocity accuracy of 0.08 m/s and velocity resolution of 0.8 m/s, at a range of 30-150 m and a velocity (of the UAS 112*b*) up to 25 m/s. If the detected object is stationary (e.g., the electrical tower 136) in the path of the UAS 112*b*, the system 100 may direct the UAS 112*b* to evade the object by signaling the UAS control system (114, FIG. 2) to maneuver the UAS away (130*a*) from the electrical tower 136, or alert the UAS control system to the presence of the electrical tower 136 until the heading of the UAS 112*b* changes such that the system 100 no longer detects the electrical tower 136.

Figure 3C:
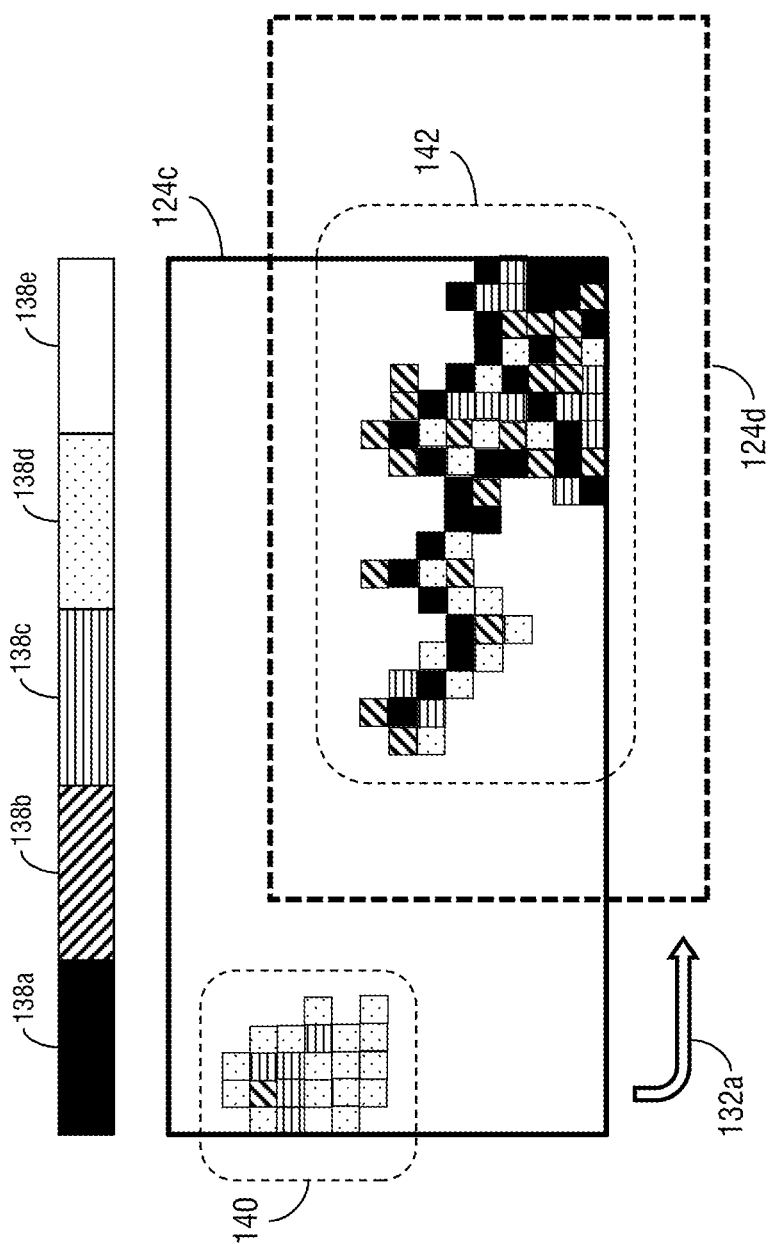
FIG. 3C is a diagrammatic illustration of operations of the system of FIG. 1.

Referring to FIG. 3C, the FOV 124*c* of the system 100 may be implemented and may operate similarly to the FOV 124/124*a* of FIG. 2, except that the control processor 122 (FIG. 2; or, alternatively, UAS control system 114) may attempt to more clearly identify or classify a detected object (e.g., the electrical tower 136 of FIG. 3B) and determine, e.g., whether the detected object is moving, (if so) its heading and velocity, and whether the detected object corresponds to a known object such as a civil or commercial aircraft, manmade structure, or unmanned aircraft system. The system 100 may, for example, interpret reflected continuous-wave signals (126, FIG. 2) within the FOV 124*c* as points of varying intensity (138*a-e*) based on, e.g., the approximate distance traveled by each reflected signal or the return time of the reflected signal. For example, some areas of the FOV 124*c* may be represented as blank (138*e*) due to the lack of reflective objects. Distant or unclear objects (140) may be represented as patches or clusters of less resolved points (138*c-d*) while closer objects (142) may include fully resolved points (138*a*).

Should the system 100 partially detect a close object 142 within the FOV 124*b*, the system may maneuver (132*a*) the CW radar assembly 102 (via the gimbals 104, 106, 108, FIGS. 1/2) to center the close object 142 within the FOV (124*d*) for clearer identification or classification. If, for example, the pattern associated with the close object 142 is moving relative to the FOV 124*c*, the system 100 may associate the close object 142 with an aircraft or vehicle proximate to the subject UAS (112*b*, FIG. 3B) and attempt to positively identify the aircraft to a desired confidence level, e.g., by correlating or cross-referencing detection data of the close object 142 with examples in the obstacle database 118 (FIG. 2). In some embodiments, the system 100 may negatively identify a detected obstacle by ruling out items in the obstacle database 118 that do not sufficiently correspond to the close object 142. If an approximate heading or velocity of the close object 142 can be determined, the system 100 may signal the UAS control system 114 to adjust the heading of the subject UAS 112*b* to avoid the close object 142.

Figure 3D:
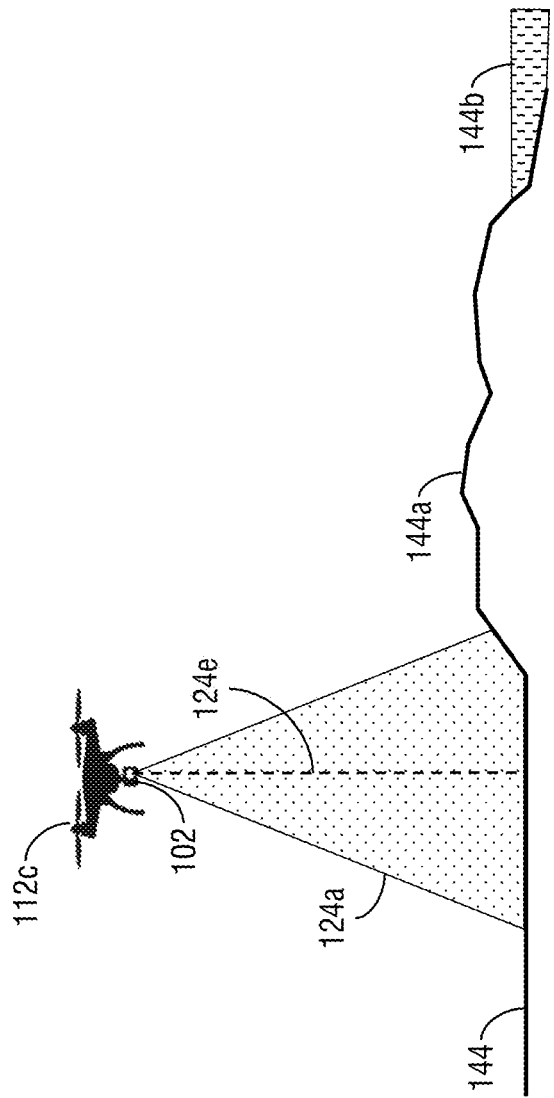
FIG. 3D is a diagrammatic illustration of a landing mode of the system and UAS of FIG. 2.

Referring to FIG. 3D, the UAS 112*c* may be implemented and may operate similarly to the UAS 112*b* of FIG. 3C, except that the system 100 of the UAS 112*c* may reorient the CW radar assembly 102 (via the gimbals 104, 106, 108, FIGS. 1/2) in anticipation of landing the UAS 112*c*. For example, the UAS 112*c* may land in coordination with its predetermined flight plan, or the UAS 112*c* may encounter conditions that make it prudent or necessary to land the UAS 112*c* immediately. The system 100 may, autonomously or semiautonomously, engage a landing mode (e.g., in conjunction with or anticipation of other landing procedures) by reorienting the CW radar assembly 102 to scan terrain (144) directly "under" the UAS 112*c* (e.g., relative to the z-axis or yaw axis of the UAS) in order to collect real-time data of the height of the UAS 112*c* above ground level as the landing proceeds. When the landing mode is engaged, the CW radar assembly 102 may scan a "downward" FOV (124*a*) tailored for a broader coverage area, shorter effective range (124*e*; e.g., 10 m), greater accuracy and resolution, and slower descent velocity (compared to, e.g., inflight velocities associated with sense-and-avoid mode). For example, in landing mode, an exemplary embodiment of the system 100 may be capable of range accuracy 0.004 m (4 mm), range resolution 0.04 m (4 cm), velocity accuracy 0.05 m/s, and velocity resolution 0.5 m/s at a descent velocity up to 5 m/s through a range of 0.04 m (4 cm)-10 m. In landing mode, the CW radar assembly 102 may achieve sufficient resolution and accuracy to differentiate level terrain (144) from uneven terrain (144*a*) or surface water (144*b*), thereby alerting the UAS control system (114, FIG. 2) to favorable or adverse landing spots when landing the UAS 112c in an unfamiliar location.

Figure 4:
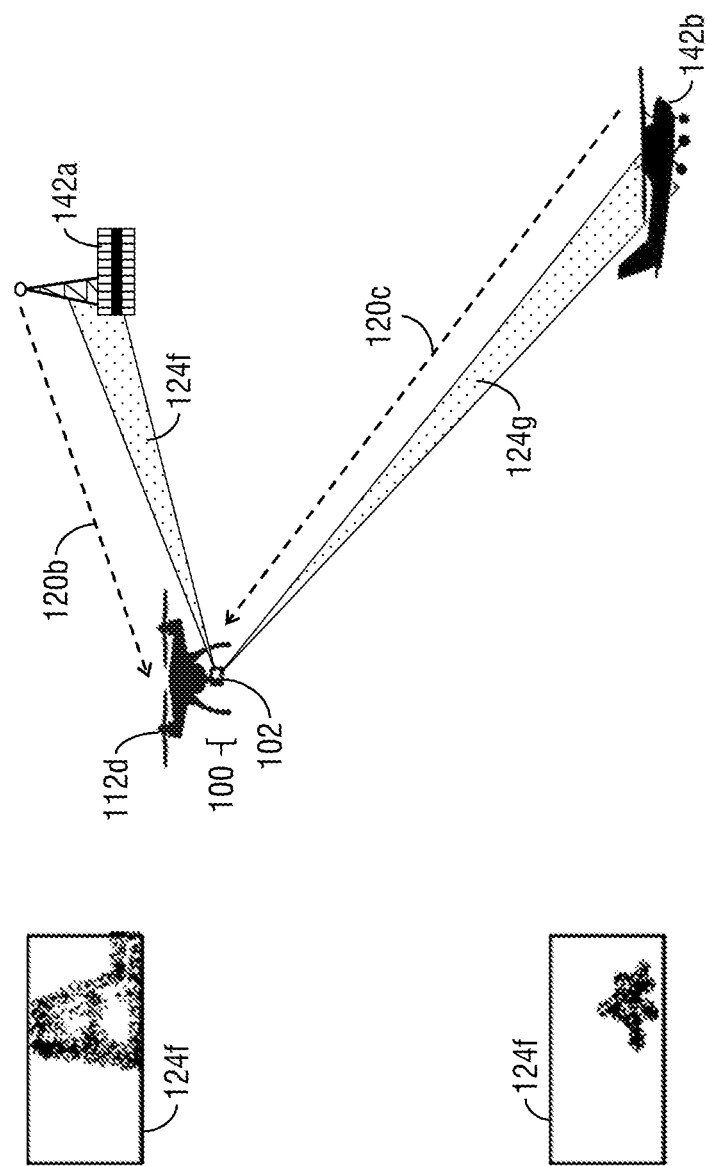
FIG. 4 is a diagrammatic illustration of sensor fusion operations of the system and UAS of FIG. 2.

Referring to FIG. 4, the UAS 112d may be implemented and may function similarly to the UAS 112c of FIG. 3D, except that the UAS 112d may fuse obstacle detection data collected by the system 100 with other sensor data to identify obstacles or objects detected by the CW radar assembly 102, e.g., to a desired confidence level. The system 100 may access position data of the subject UAS 112d (e.g., its current absolute position, its position relative to a reference point, or its current rotational orientation) to determine position data associated with the current FOV (124f-g) and thereby determine, based on distance data of a detected close object 142a or proximate aircraft 142b, an approximate position of the close object or proximate aircraft. For example, the system 100 may scan the close object 142a and the proximate aircraft 142b via the CW radar assembly 102 (based on FOV 124f-g) and attempt to identify both the close object and the proximate aircraft by centering the CW radar assembly to determine distance, size, and shape data. If, for example, the subject UAS 112d is equipped with a positioning system (116, FIG. 2) and an ADS-B compatible receiver (signal receiver 120, FIG. 2), the system 100 may correlate ownship position data of the UAS 112d and the distance and obstacle data generated by the CW radar assembly 102 based on the close object 142a and proximate aircraft 142b with position data based on received ADS-B signals 120b-c transmitted by the close object 142a and proximate aircraft 142b. The system 100 may correlate these two sets of data to identify the close object 142a as a fixed structure (e.g., a ground-based control facility) and cross-reference the proximate aircraft 142b with the unique identification data (e.g., tail number, ICAO identifier) contained within its unique ADS-B transmissions (received signal 120c).

As will be appreciated from the above, systems according to embodiments of the inventive concepts disclosed herein may provide targeted radar-based sense-and-avoid capability for compact unmanned vehicles. The radar system may provide track-ahead detection to anticipate obstacles in its future path and reorient to provide close-range radar altitude and collect terrain data throughout a landing procedure.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

I claim:

1. A vehicle-based gimbal-assisted radar detection system, comprising:
   a continuous-wave (CW) radar assembly couplable to an unmanned aircraft system (UAS) at a rotational orientation via a plurality of serially connected gimbals, the rotational orientation including one or more of a yaw angle, a pitch angle, and a roll angle, the plurality of gimbals coupled to a control system of the UAS;
   the CW radar assembly including one or more of an emitter, a receiver, and a processor coupled to the emitter and the receiver, the CW radar assembly configured to:
      maintain the rotational orientation in response to one or more of a velocity change of the UAS, a heading change of the UAS, and an orientation change of the UAS;
      emit, via the emitter, at least one first continuous-wave electromagnetic (CWEM) signal, the first CWEM signal associated with one or more of a field of view (FOV) and an effective range;
      generate, via the processor, detection data associated with at least one obstacle within the FOV by receiving, via the receiver, at least one second CWEM signal based on the first CWEM signal and reflected by the at least one obstacle;
      adjust the rotational orientation by articulating one or more of the plurality of gimbals; and
      generate, via the processor, obstacle data associated with the at least one obstacle and based on the detection data, the obstacle data including at least one of a size of the obstacle, a shape of the obstacle, and a proximity of the obstacle.

2. The vehicle-based gimbal-assisted radar detection system of claim 1, wherein the CW radar assembly is configured to adjust one or more of the rotational orientation and the FOV based on the detection data.

3. The vehicle-based gimbal-assisted radar detection system of claim 1, wherein:
   the CW radar assembly is configured to forward one or more of the detection data and the obstacle data to a control system of the UAS.

4. The vehicle-based gimbal-assisted radar detection system of claim 3, wherein the processor is configured to:
   receive from the control system one or more of first position data associated with the UAS and second position data associated with the at least one obstacle;
   generate third position data associated with the FOV based on the first position data and the rotational orientation;
   and
   generate fourth position data associated with the at least one obstacle based on one or more of the obstacle data, the second position data, and the third position data.

5. The vehicle-based gimbal-assisted radar detection system of claim 1, wherein:
   the CW radar assembly is configured to receive flight plan data from the control system, the flight plan data associated with at least one of a heading change of the UAS and an altitude change of the UAS; and
   the CW radar assembly is configured to adjust one or more of the FOV, the rotational orientation, and the effective range based on the flight plan data.

6. The vehicle-based gimbal-assisted radar detection system of claim 1, wherein the at least one obstacle is a first obstacle and the obstacle data is first obstacle data, and:

the CW radar assembly includes a memory coupled to the processor and configured to store second obstacle data associated with at least one second obstacle; and the processor is configured to identify the at least one first obstacle by correlating the first obstacle data with the second obstacle data.

7. The vehicle-based gimbal-assisted radar detection system of claim 1, wherein the obstacle data includes terrain data associated with a landing of the UAS.

8. The vehicle-based gimbal-assisted radar detection system of claim 1, wherein the processor is configured to adjust the effective range based on the rotational orientation.

9. An unmanned aircraft system (UAS), comprising:
an airframe at least partially enclosing
  a) a propulsion system capable of propelling the UAS at one or more of a velocity, a heading, and a first rotational orientation, the first rotational orientation including at least one of a first roll angle, a first pitch angle, and a first yaw angle; and
  b) a control system coupled to the propulsion system and including at least one first processor, the control system configured to adjust one or more of the velocity, the heading, and the first rotational orientation via the propulsion system;
a plurality of gimbals serially coupled to the airframe;
a continuous-wave (CW) radar assembly coupled to the airframe and to the control system via the plurality of gimbals at a second rotational orientation including at least one of a second yaw angle, a second roll angle, and a second pitch angle, the CW radar assembly including at least one of an emitter, a receiver, and a second processor coupled to the control system, the emitter, and the receiver, the CW radar assembly configured to:
  maintain the second rotational orientation in response to a change of one or more of the velocity, the heading, and the first rotational orientation via the plurality of gimbals;
  adjust the second rotational orientation by articulating one or more of the plurality of gimbals;
  emit, via the at least one emitter, at least one first CW electromagnetic (CWEM) signal, the at least one first CWEM signal associated with a field of view (FOV) and an effective range;
  generate detection data associated with at least one obstacle within one or more of the FOV and the effective range by receiving, via the receiver, at least one second CWEM signal based on the first CWEM signal and reflected by the at least one obstacle; and
  generate obstacle data associated with the at least one obstacle based on at least the detection data, the obstacle data including one or more of a size of the obstacle, a shape of the obstacle, and a proximity of the obstacle.

10. The UAS of claim 9, wherein the CW radar assembly is configured to adjust one or more of the second rotational orientation and the FOV based on the detection data.

11. The UAS of claim 9, wherein:
the CW radar assembly is configured to forward one or more of the detection data and the obstacle data to the control system; and
the control system is configured to adjust one or more of the velocity, a heading, and a first rotational orientation based on one or more of the detection data and the obstacle data.

12. The UAS of claim 9, wherein:
the control system includes a first memory configured to store flight plan data, the flight plan data associated with one or more of a change of the heading, a change of the velocity, an altitude change of the UAS, a change in the first rotational orientation, and a landing site of the UAS;
the control system is configured to forward the flight plan data to the CW radar assembly; and
the CW radar assembly is configured to adjust one or more of the FOV, the second rotational orientation, and the effective range based on the flight plan data.

13. The UAS of claim 9, further comprising:
a positioning system coupled to the control system and including at least one position sensor configured to determine first position data associated with the UAS; and
the control system configured to receive the first position data and generate second position data associated with the FOV based on the second orientation and the first position data;
wherein the obstacle data includes third position data associated with the at least one obstacle.

14. The UAS of claim 13, further comprising:
at least one automated dependent surveillance-broadcast (ADS-B) compatible receiver coupled to the control system, the at least one ADS-B compatible receiver configured to receive at least one ADS-B signal transmitted by a proximate object corresponding to the at least one obstacle;
wherein the control system is configured to determine one or more of a location of the at least one proximate object and the first position data based on the received ADS-B signal; and
the CW radar assembly is configured to determine the obstacle data by correlating the third position data and the one or more determined locations, the obstacle data including at least one identifier corresponding to the at least one proximate object.

15. The UAS of claim 9, wherein the control system is a remote control system wirelessly coupled to one or more of the propulsion system and the CW radar assembly.

16. The UAS of claim 9, wherein the at least one obstacle is a first obstacle and the obstacle data is first obstacle data, and:
at least one of the control system and the CW radar assembly includes a second memory configured to store second obstacle data associated with at least one second obstacle; and
the CW radar assembly is configured to:
  match the first obstacle to at least one second obstacle of the one or more second obstacles by correlating the first obstacle data with the second obstacle data; and
  report the at least one matched second obstacle to the control system.

17. The UAS of claim 9, wherein the obstacle data includes terrain data associated with a landing of the UAS.

18. The UAS of claim 9, wherein the CW radar assembly is configured to adjust the effective range based on the second rotational orientation.

* * * * *